W. C. McGill,
Caster.
No. 89,418.  Patented Apr. 27, 1869.

Witness:
C. L. Fisher
T. Jeff Phelps

Inventor.
W. C. McGill

W. C. McGILL, OF CINCINNATI, OHIO.

Letters Patent No. 89,418, dated April 27, 1869.

IMPROVEMENT IN CASTERS.

The Schedule referred to in these Letters Patent and making part of the same

*To all whom it may concern:*

Be it known that I, W. C. McGILL, of Cincinnati, in the county of Hamilton, and the State of Ohio, have invented a new and useful Improvement in Casters for Furniture, of which the following is a full and clear description, reference being had to the accompanying drawings, making part of this specification.

The nature of my invention consists in a spherical roller confined between two circular pendants from the body of the caster.

Figure 1:
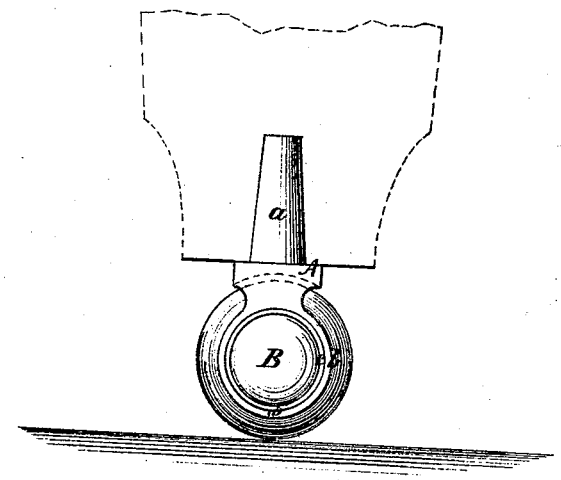
Figure 1 is an elevation of one side of the caster.
Figure 2:
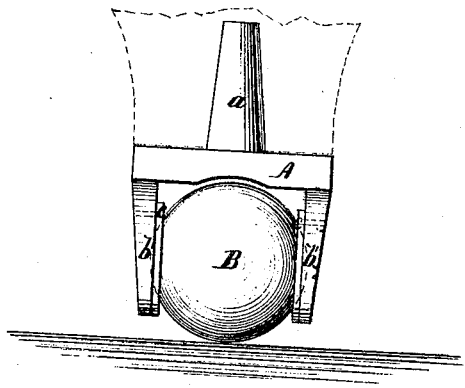
Figure 2 is an elevation of the front of the same.

A is the body of the caster, the upper surface of which rests upon or is let into the end of a leg of a stool, chair, or other desirable object for which it is adapted.

The stem $a$ is entered into the wood, strengthening the connection of the furniture and caster.

Two circular bearings $b$ and $b'$ are pendent from the body A of the caster, to which they are firmly secured. The bearings $b$ and $b'$ are thin rings of metal.

$b'$ is cut through at $b''$.

Thimble-washers $c$ are inserted in the bearings; the ball B is in contact with and is retained in place between the thimble-washers $c$.

To insert the ball B in its place between the washers or bearings, the bearing $b'$ is opened at the bottom $b''$, and closed when the ball is in place.

The ball, in its rotations, which from its construction is in any direction, bears entirely upon the bearings, or upon the washers in the bearings, or entirely upon the bearings, the object of the washers being to lessen the friction between the ball and its bearings. Although I prefer to use the washers in the construction of the caster, yet they may be dispensed with, and the operation be in all respects nearly the same.

I am aware that spherical balls are in common use for casters; but

What I claim as my improvement, is—

The construction of the circular rings, or bearings $b$ and $b'$, as shown and described.

W. C. McGILL.

Witnesses:
   C. L. FISHER,
   T. J. PHELPS.